(No Model.)
E. T. COVELL.
HARNESS SADDLE TREE.
No. 370,318. Patented Sept. 20, 1887.
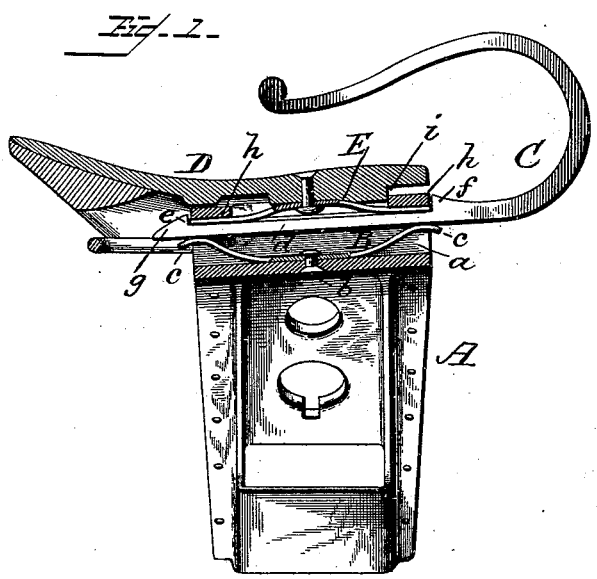
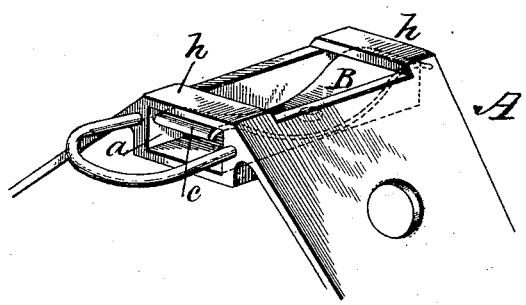
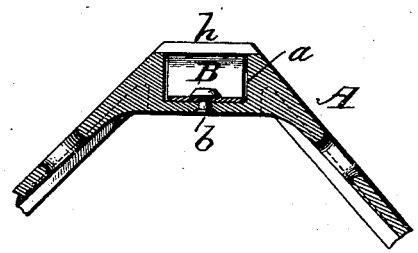
Witnesses
Inventor
Edward T. Covell.
By his Attorney
Chas. H. Fowler.

UNITED STATES PATENT OFFICE.

EDWARD T. COVELL, OF NEW BEDFORD, MASSACHUSETTS, ASSIGNOR OF ONE-HALF TO CHARLES F. CUSHING, OF SAME PLACE.

HARNESS-SADDLE TREE.

SPECIFICATION forming part of Letters Patent No. 370,318, dated September 20, 1887.

Application filed January 18, 1887. Serial No. 224,705. (No model.)

*To all whom it may concern:*

Be it known that I, EDWARD T. COVELL, a citizen of the United States, residing at New Bedford, in the county of Bristol and State of Massachusetts, have invented certain new and useful Improvements in Harness-Saddle Trees; and I do hereby declare that the following is a full, clear, and exact description of the same, reference being had to the annexed drawings, making a part of this specification, and to the letters and figures of reference marked thereon.

Figure 1 of the drawings is a sectional elevation of a harness-saddle tree constructed in accordance with my invention, showing the seat in section, connected thereto, and also the checkrein-hook, the latter being in elevation; Fig. 2, a detail view, in perspective, of the upper portion of the harness-saddle tree embodying my invention; and Fig. 3, a transverse section of Fig. 2.

The present invention has for its object to provide a tree for harness-saddles to which the seat and checkrein-hook may be readily connected to the tree without the use or employment of screws or other like fastenings, and can be more readily detached and removed therefrom without injury to the saddle by ripping the lining thereof. A further object of the invention is to dispense with the usual bolts, nuts, and screws, which would tend to hurt the horse's back, which is a great objection to the trees now in ordinary use, which objects I attain by the construction substantially as shown in the drawings, and hereinafter described and claimed.

In the accompanying drawings, A represents the harness-saddle tree constructed in accordance with my invention, said tree being formed at its upper side with a channel, $a$, in which is located a spring, B, connected thereto by a rivet, $b$, or any other preferred and well-known means. This spring is what is termed a "flat bow-spring," curved at its ends, as shown at $c$, which ends press up against the under side of the shank $d$ of the checkrein-hook C, to retain it in position within the channel $a$ of the saddle-tree. Above the channel $a$ are formed stops $h$, extending transversely across the channel, as shown more clearly in Fig. 2, the purpose of which is to act in connection with the shoulders $e\ f$ on the shank $d$, and also in connection with the spring B, to securely hold the hook C to the saddle-tree and admit of the hook being readily detached when desired. The stops $h$ perform a further function in holding the seat D to the saddle-tree by means of the catch E, the ends of which pass under the stops, as shown in Fig. 1. The end of the shank $d$ of the hook C is beveled, as shown at $g$, to facilitate its entrance into the channel $a$ when connecting the hook to the tree, and the seat D is formed with a shoulder, $i$, to prevent its being pushed forward when in position.

The construction of the seat and checkrein-hook will form the subject of separate patents, and therefore further description on these features of the invention is not considered necessary.

By the construction of the harness-saddle tree as above described, it is adapted for attaching thereto a seat and checkrein-hook, and also enabling them to be readily detached and removed without ripping or injuring the lining of the harness-saddle when finished, and the hook can be removed from the tree without the necessity of removing the seat.

As will be noticed, the walls of the saddle tree or channel in which the shank of the checkrein-hook is located prevent the hook from moving laterally from either to the right or left, this being an essential feature and an important result in providing the tree with a channel having side walls.

Having now fully described my invention, what I claim as new, and desire to secure by Letters Patent, is—

1. A saddle-tree provided with a channel having side walls extending throughout its entire length, and stops extending over the ends of said channel, as shown, to adapt the channel for the reception of the shank of a checkrein-hook, substantially as and for the purpose specified.

2. A harness-saddle tree provided with a channel, and transverse stops located above and over it and at its ends, as shown, and a bow-spring extending longitudinally in the channel and having its ends free to press up against the shank of the checkrein-hook to hold it in position, substantially as and for the purpose set forth.

In testimony that I claim the above I have hereunto subscribed my name in the presence of two witnesses.

EDWARD T. COVELL.

Witnesses:
A. EDWIN CLARKE,
DAVIS DEVOLL.